May 23, 1961    F. P. RICHARDS    2,984,842
LATERAL-SHIFT LITTER
Filed May 20, 1959

INVENTOR.
FRED P. RICHARDS
BY
ATTORNEY

United States Patent Office 2,984,842
Patented May 23, 1961

2,984,842
LATERAL-SHIFT LITTER
Fred P. Richards, 2835 W. 24th Ave., Denver 11, Colo.
Filed May 20, 1959, Ser. No. 814,433
10 Claims. (Cl. 5—82)

This invention relates to facilities, indiscriminately termed litters or stretchers, extensively utilized in diverse structural and manipulative particularly for the transfer, conveyance and portage of physically incapacitated individuals in prostrate or recumbent attitudes, and has as an object to provide a novel and improved such facility of enhanched utility.

A further object of the invention is to provide a novel and improved litter unit that is uniquely and conveniently laterally shiftable relative to a superposed burden and an underlying supporting surface.

A further object of the invention is to provide a novel and improved litter unit adapted for selective lateral shift in either transverse direction relative to a superposed burden alone, relative to an underlying supporting surface alone, or simultaneously relative to both.

A further object of the invention is to provide a litter unit characterized by novel features adapting the unit for lateral shift in a manner uniquely facilitating transfer of a human burden served thereby.

A further object of the invention is to provide a novel and improved litter unit conditioned by a lateral shiftability relative to a superposed burden and an underlying supporting surface for advantageous use in any and all of the many particular situations involving transfer of incapacitated humans.

A further object of the invention is to provide a novel and improved construction and operative correlation of elements constituting a laterally-shiftable litter.

A further object of the invention is to provide a novel and improved lateral-shift litter that is expedient and economical of production in any desired range of specific sizes and capacities, that is compact, sturdy and durable in a practical organization of nominal weight, and that is positive and efficient in atainment of the ends for which designed.

With the foregoing and other objects in view, my invention consists in the construction, arrangement, and operative combination of elements as hereinafter set forth, pointed out in my claims, and illustrated by the accompanying drawing, in which—

Figure 1:
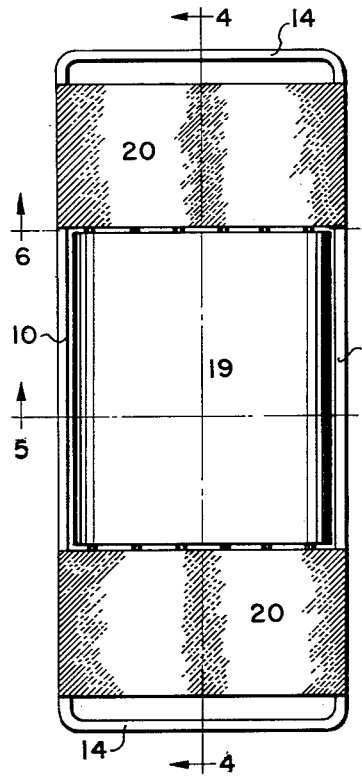
Figure 1 is a top plan view of a typical embodiment of the invention as organized ready for practical use.
Figure 2:
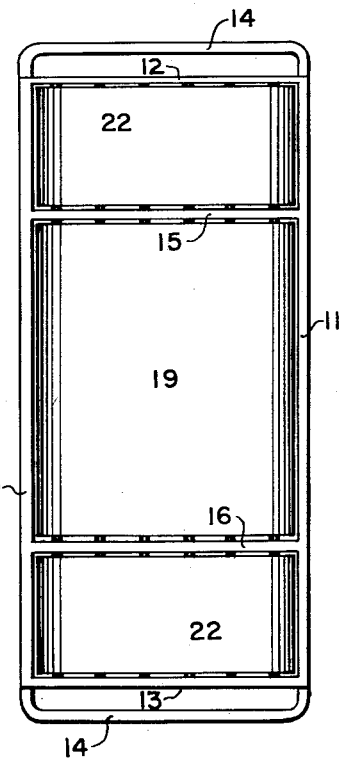
Figure 2 is a bottom plan view of the arrangements according to Figure 1.
Figure 3:
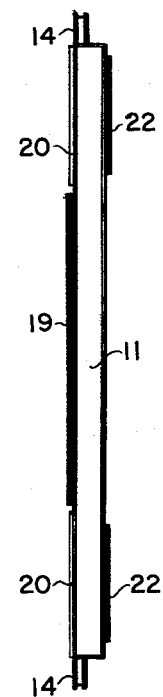
Figure 3 is a side elevational view of the litter unit according to the preceding views.
Figure 4:
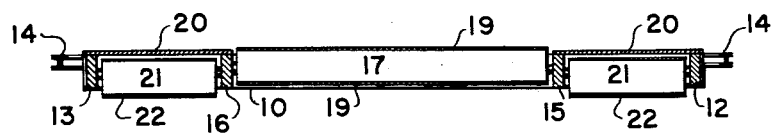
Figure 4 is a section longitudinally through the organization according to the preceding views taken substantially on the indicated line 4—4 of Figure 1.
Figure 5:
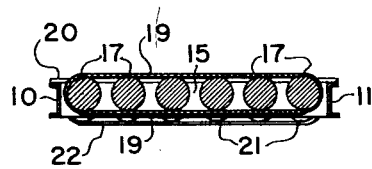
Figure 5 is a transverse section through the unit of the preceding views taken substantially on the indicated line 5—5 of Figure 1.
Figure 6:
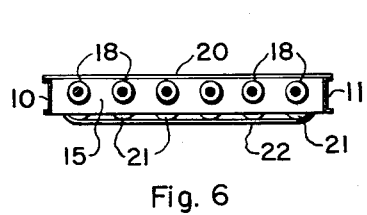
Figure 6 is a transverse section similar to Figure 5 taken substantially on the indicated line 6—6 of Figure 1.

Occasion for and the techniques and problems incident to transfer, conveyance and portage of incapacitated individuals by means of litters and stretchers in, to and from the home, in, to and from hospitals and sanitaria, at the scene of accidents, the site of injuries, and the like, are so universally prevalent and generally understood as to preclude elaboration herein. Considerations of occupant protection and comfort, facility of use in diverse situations, economy and durability of construction, and wide practicality have inspired the production of a diversity of conventionally-similar litters alike characterized by the necessity of bodily elevating and concurrently laterally shifting the occupant transferred thereto or therefrom with obvious consequent infelicity, and the instant invention is hence directed to the provision of a litter capable in attainment of all of the functions of conventional such units of minimizing and very largely obviating bodily manipulation of the occupant incidental to effective use thereof.

As typified by the views of the drawing and in analogy with conventional litter or stretcher construction, the features of the instant invention are coactively associated and unitarily integrated in and with a rigid, rectangular frame of appropriate length and width proportions defined by like, spacedly-parallel side bars 10 and 11 of suitable rigid, light-weight material, such as aluminum or magnesium metal, and like, spacedly-parallel end bars 12 and 13 of the same or equivalent material perpendicularly spanning between and interconnecting corresponding ends of said bars 10 and 11. The frame comprised from the bars 10, 11, 12 and 13 is flat in a thickness, or dimension perpendicular to its face planes, determined by the corresponding width of said bars to be small in proportion to the areal determinants thereof, whereby to dispose the upper face of said frame at but a small elevation above a horziontal supporting surface engaged by the lower face of the frame, and handles 14 of any preferred structure particularly are suitably associated with the opposite ends of said frame as means conditioning the unit for convenient manipulation and portage.

Distinguishing from known conventional practice in accordance with and to give practical effect to the principles of the invention, like, rigid struts 15 and 16 fixedly span in spaced relation parallel to the end bars 12 and 13 between the side bars 10 and 11 of the frame to divide the latter into three open bays whereof the one centrally of the frame end-limited by the struts 15 and 16 has an extent longitudinally of the frame preferably exceeding the half-length of the latter and the bays end-limited by the bar 12 and strut 15, and by the bar 13 and strut 16, respectively, are preferably of equal extent longitudinally of the frame in an arrangement symmetrical with respect to the transverse median line of the assembly.

The central bay of the frame bounded by the side bars 10, 11 and the struts 15, 16 is substantially filled by a coplanar array of like, cylindrical rollers 17 formed of suitable rigid, light-weight material in any expedient detail of structure to uniformity of diameter on the order of, but not exceeding, the thickness of the frame between and perpendicular to its plane faces, which rollers 17 are slightly spaced apart in parallel longitudinally of and to substantially fill the space between the side bars 10 and 11 end-limited by the struts 15 and 16 and are individually engaged and journaled at their respective ends for free, independent rotation in bearings 18, desirably of anti-friction type, operatively associated with and spaced apart longitudinally of the opposed faces of said struts, a feature particular to the mounting of said rollers being an arrangement of the bearings 18 such as to dispose the axes of revolution of the rollers 17 in a common plane parallel to the face planes of the associated frame and more nearly the upper than the lower thereof for consequent slight projection of upper arcs of said rollers through the upper face plane of the frame and retraction of lower arcs of the rollers inwardly and slightly away from the lower face plane of the frame. Correlating and completing the array of rollers 17 for intended functioning as a laterally-movable platform section of the litter unit, a flexible, substantially-inextensible web 19 of suitable strong material, such as fabric, sheet rubber, rubberized fabric, and the equivalent, is moderately tensioned about and in embracing relation with said rollers tangent to and in contact with upper and lower arcs thereof to constitute an endless member conformably overlying the laterally-outward side arcs of the rollers 17 adjacent the side bars 10 and 11 for travel therewith out of engagement with said side bars as the supporting rollers are caused to rotate. Substantially covering the length as well as the width of the array of rollers 17, either as a sheet unit overlay or as a succession of spacedly-complementary bands, the member 19 as supported for travel by the rollers 17 provides a litter central section readily shiftable in either transverse direction laterally of the litter frame in an association with the latter such as to elevate the upper run of said member slightly above the upper plane face of the frame and to retract the lower run of said member away from the lower plane face of said frame when the latter is engaged with a horizontal supporting surface in a usual position of use. Obviously, transfer of a burden from the horizontal surface supporting the litter in its position of use to occupancy of the litter is eased and expedited by provision of the laterally-shiftable platform section comprised from the rollers 17 and web 19, since with very slight initial elevation of the burden incident to a rolling or lateral shift thereof effective to initiate burden engagement with the adjacent margin of the movable platform a subsequent urging of the burden laterally of and to full support upon the litter is accommodated through travel of the web with, on and about its supporting rollers.

The plane face of the frame intersected by upward projection of the roller arcs and associated web 19 therethrough is finished for its intended function of supporting a charge imposed upon the litter unit by means of thin, substantially rigid panels 20 of any appropriate material affixed to coplanar edges of the frame side bar, end bar, and strut components in covering relation with the otherwise open bays characterizing the end portions of the frame at the outward sides of the struts 15 and 16, which panels 20 may be exteriorly finished, covered, padded, or upholstered as may be desired to comfortably realize the supporting relation with extremities of a litter unit occupant for which said panels are supplied.

Complementary to and available to at times coactively supplement the laterally-shiftable platform typified by the web 19, means operatively accommodated in the frame bays at the ends of the assembly are provided in underlying relation with the panels 20 for laterally-shiftable, litter-supporting engagement with a surface to which the litter may be applied in its position of use. In analogy with the platform typified by the rollers 17 and web 19, the means provided to support the litter unit for lateral shift comprise, in expedient indentity at each end of the assembly, an axially-coplanar array of rollers 21, desirably the same as the rollers 17 save as to length, individually journaled at their ends for free rotation in and to span in spaced parallelism longitudinally of the assembly between bearings 18 suitably spaced apart along opposed faces of the frame end bars and struts completing each end bay of the frame, and an endless, flexible web 22, essentially equivalent to the web 19, transversely embracing the array of rollers 21 substantially filling each of the frame end bays. For realization of their purposes, the rollers 21 of each array are correspondingly mounted with the plane common to their axes parallel to the face planes of the frame and more nearly adjacent the lower than the upper of said face planes, whereby to dispose upper arcs of said rollers, and the run of the web 22 supported thereby, subjacent and in clearing relation with the panel 20 closing one side of the bay, and to project lower arcs of said rollers, and the run of the web 22 thereover, outwardly through and slightly beyond the lower face plane of the frame. Equipped with the rollers 21 and webs 22 as shown and described, the litter unit engages any supporting surface to which it may be applied through and by means of the lower runs of the webs 22 which, in their projection through the lower face of the frame, operate to elevate said frame, the platform typified by the rollers 17 and web 19, and the litter burden relative to the supporting surface and to provide a rolling contact with the latter accommodating lateral shift of the litter unit and its burden in either transverse direction and to any extent facilitative of burden transfer to and from the unit.

The webs 19 and 22 may be initially-endless members sized for appropriate tensioning about their associated roller arrays, said webs may be characterized by an inherent elasticity, in whole or in part, effective to maintain operative tensioning thereof, or said webs may be constituted from initially-flat lengths of material endconnected to endless-band form in any feasible conventional manner admitting of convenient replacement and length-adjustment.

Organized as a rigid, light-weight unit applicable to effectively accomplish all of the useful functions of conventional stretchers and litters, the improvement conditioned for lateral shift relative to a supporting surface and for lateral shift of its charge in the manner and by the means described is a facility of enhanced utility and practical advantage in its wide adaptability to the resolution of use problems beyond the capacity of analogous equipment hitherto known.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A litter comprising a generally-rectangular, elongated, flat, rigid, handled frame adapted for the fully-supported transport of recumbent humans received longitudinally thereof, load-sustaining means centrally associated within said frame inwardly from its ends for free lateral displacement in both directions relative to and in outwardly-spaced, close parallelism with the upper face plane thereof, and complementary load-sustaining means associated within the end portions of the frame exposed at the opposite sides of said first means for individual free lateral displacement in both directions relative to and in outwardly-spaced, close parallelism with the lower face plane of the frame.

2. A litter comprising a generally-rectangular, elongated, flat, rigid, handled frame adapted for the fully-supported transport of recumbent humans received longitudinally thereof, load-sustaining means centrally associated within said frame inwardly from its ends for free lateral displacement in both directions relative to and in outwardly-spaced, close parallelism with the upper face plane thereof, complementary load-sustaining means associated within the end portions of the frame exposed at the opposite sides of said first means for individual free lateral displacement in both directions relative to and in outwardly-spaced, close parallelism with the lower face plane of the frame, and load-sustaining panels fixedly and coextensively closing upper face plane areas of the frame end portions spacedly superjacent the laterally-displaceable means associated therewith.

3. A litter comprising a generally-rectangular, elongated, flat, rigid, handled frame adapted for the transport of recumbent humans, struts fixed in spaced parallelism transversely of said frame defining therewithin a central bay between like end bays, load-sustaining means operatively spanning between said struts in substantial closing relation with said central bay for free lateral displacement in both directions relative to and in outwardly-spaced, close parallelism with the upper face plane of the frame, and complementary load-sustaining means operatively mounted within the frame end bays for individual free lateral displacement in both directions relative to and in outwardly-spaced, close parallelism with the lower face plane of the frame.

4. A litter comprising a generally-rectangular, elongated, flat, rigid, handled frame adapted for the transport of recumbent humans, struts fixed in spaced parallelism transversely of said frame defining therewithin a central bay between like end bays, load-sustaining means operatively spanning between said struts in substantial closing relation with said central bay for free lateral displacement in both directions relative to and in outwardly-spaced, close parallelism with the upper face plane of the frame, complementary load-sustaining means operatively mounted within the frame end bays for individual free lateral displacement in both directions relative to and in outwardly-spaced, close parallelism with the lower face plane of the frame, and load-sustaining panels fixedly and coextensively closing upper face plane areas of the frame end bays spacedly superjacent the laterally-displaceable means associated therewith.

5. A litter comprising a generally-rectangular, elongated, flat, rigid, handled frame adapted for the transport of recumbent humans, struts fixed in spaced parallelism transversely of said frame defining therewithin a central bay between like end bays, an array of like cylindrical rollers individually end-journaled in and spaning in axially-coplanar, closely-spaced parallelism between said struts across said central bay with their upper arcs correspondingly intersecting the upper face plane of the frame and their lower arcs spaced inwardly from the lower face plane of the frame, an endless web embracing the array of rollers for free displacement thereon and thereabout in both directions laterally of and in outwardly-spaced, close parallelism with the upper face plane of the frame, and complementary roller array and associated endless web assemblies operatively mounted within the frame end bays for individual free lateral displacement in both directions relative to and in outwardly-spaced, close parallelism with the lower face plane of the frame.

6. A litter comprising a generally-rectangular, elongated, flat, rigid, handled frame adapted for the transport of recumbent humans, struts fixed in spaced parallelism transversely of said frame defining therewithin a central bay between like end bays, an array of like cylindrical rollers individually end-journaled in and spanning in axially-coplanar, closely-spaced parallelism between said struts across said central bay with their upper arcs correspondingly intersecting the upper face plane of the frame and their lower arcs spaced inwardly from the lower face plane of the frame, an endless web embracing the array of rollers for free displacement thereon and thereabout in both directions laterally of and in outwardly-spaced, close parallelism with the upper face plane of the frame, complementary roller array and associated endless web assemblies operatively mounted within the frame end bays for individual free lateral displacement in both directions relative to and in outwardly-spaced, close parallelism with the lower face plane of the frame, and load-sustaining panels fixedly and coextensively closing upper face plane areas of the frame end bays spacedly superjacent the roller and web assemblies associated therewith.

7. A litter comprising a generally-rectangular, elongated, flat, rigid, handled frame adapted for the transport of recumbent humans, structs fixed in spaced parallelism transversely of said frame defining therewithin a central bay between like end bays, an array of like, cylindrical rollers individually end-journaled in and spanning in axially-coplanar, closely-spaced parallelism between said structs across said central bay with their upper arcs correspondingly intersecting the upper face plane of the frame and their lower arcs spaced inwardly from the lower face plane of the frame, an endless web embracing the array of rollers for free displacement thereon and thereabout in both directions laterally of and in outwardly-spaced, close parallelism with the upper face plane of the frame, a similar array of rollers associated for independent rotation with and substantially filling each of the end bays in an axially-coplanar disposition longitudinally of the frame effective to project lower arcs thereof through the lower face plane of the frame and to retract their upper arcs inwardly from the upper face plane of the frame, and an endless web embracing the roller array of each end bay for individual free lateral displacement thereon and thereabout in both directions relative to and in outwardly-spaced, close parallelism with the lower face plane of the frame.

8. A litter comprising a generally-rectangular, elongated, flat, rigid, handled frame adapted for the transport of recumbent humans, struts fixed in spaced parallelism transversely of said frame defining therewithin a central bay between like end bays, an array of like, cylindrical rollers individually end-journaled in and spanning in axially-coplanar, closely-spaced parallelism between said struts across said central bay with their upper arcs correspondingly intersecting the upper face plane of the frame and their lower arcs spaced inwardly from the lower face plane of the frame, an endless web embracing the array of rollers for free displacement thereon and thereabout in both directions laterally of and in outwardly-spaced, close parallelism with the upper face plane of the frame, a similar array of rollers associated for independent rotation with and substantially filling each of the end bays in an axially-coplanar disposition longitudinally of the frame effective to project lower arcs thereof through the lower face plane of the frame and to retract their upper arcs inwardly from the upper face plane of the frame, an endless web embracing the roller array of each end bay for individual free lateral displacement thereon and thereabout in both directions relative to and in outwardly-spaced, close parallelism with the lower face plane of the frame, and a load-sustaining panel fixedly and coextensively closing the upper face plane area of each frame end bay spacedly superjacent the roller and web assembly associated therewith.

9. In a litter, the combination with a generally-rectangular, elongated, flat, rigid, handled frame adapted for the fully-supported transport of recumbent humans received longitudinally thereof, of load-sustaining means associated within and as the major central area of said frame inwardly from its ends for free shift in both directions laterally thereof parallel to and in slight projection through the upper face plane of the frame, and analogous load-sustaining means associated within the frame ends exposed at opposite sides of said first means for free, independent shift in both directions laterally of the frame parallel to and in slight projection through the lower face plane thereof.

10. In a litter having a generally-rectangular, elongated, flat, rigid, handled frame adapted for the fully supported transport of recumbent humans received longitudinally thereof, the improvements which comprise load-sustaining means associated within and as the major central area of the frame inwardly from its ends for free shift in both directions laterally thereof parallel to and in slight projection through the upper face plane of the frame and analogous load-sustaining means associated within the frame ends exposed at opposite sides of said first means for free, independent shift in both directions laterally of the frame parallel to and in slight projection through the lower face plane thereof.

References Cited in the file of this patent
UNITED STATES PATENTS

| | | |
|---|---|---|
| 845,966 | Morris | Mar. 5, 1907 |
| 1,068,345 | Kemmler | July 22, 1913 |
| 2,192,821 | Torines | Mar. 5, 1940 |